United States Patent [19]
Andres et al.

[11] 3,851,950

[45] Dec. 3, 1974

[54] PROJECTION SCREEN

[75] Inventors: William A. Andres, Hopkins; Larry D. Quanrud, Minneapolis; Charles J. Koppa, Wayzata; Larry F. Becker; William K. Christoffersen, both of Minneapolis; James L. Keely, Wayzata, all of Minn.

[73] Assignee: Washington Scientific Industries, Inc., Long Lake, Minn.

[22] Filed: June 18, 1973

[21] Appl. No.: 370,950

[52] U.S. Cl. ............... 350/125, 156/7, 248/466, 350/129, 156/21
[51] Int. Cl. ............................................ G03b 21/56
[58] Field of Search ........... 350/125, 117, 129, 124, 350/120; 161/3.5; 248/466; 156/7, 21, 22

[56] References Cited
UNITED STATES PATENTS

| | | |
|---|---|---|
| 3,408,132 | 10/1968 | Chandler et al. ................ 350/125 |
| 3,464,870 | 9/1969 | Forsma et al. ................ 156/21 |
| 3,473,862 | 10/1969 | Hauber et al. ................ 350/117 |
| 3,499,780 | 3/1970 | Etherington et al. ............ 156/21 X |
| 3,511,555 | 5/1970 | O'Brien ................ 350/117 |
| 3,773,579 | 11/1973 | Michelson et al. ............ 156/21 |

Primary Examiner—Richard A. Wintercorn
Attorney, Agent, or Firm—Lew Schwartz; Wayne A. Sivertson

[57] ABSTRACT

A front projection screen formed of an aluminum member having a reflecting surface which is etched and anodized to provide random non-directional surface irregularities thereon. The reflecting surface may be provided with a concave spherical configuration. In one embodiment, the reflecting surface has a reading line thereon and the entire screen may be pivoted to align the reading line with a line of printed matter projected on the screen.

17 Claims, 2 Drawing Figures

PATENTED DEC 3 1974

3,851,950

PROJECTION SCREEN

BACKGROUND OF THE INVENTION

Front or reflecting projection screens have been developed in many forms dependent upon the environment in which they will be used. Historically, the greatest effort has been directed to increasing the brightness of front projection screens through the use of various materials and treatments of the reflecting surface such that the surface will concentrate the image within narrower angles. For this purpose, glass or plastic beads, embossed or scored lenticulations, bubbles, etc., have been employed with significant success. More recently, a highly directional front projection screen employing a specially treated aluminum sheet has been developed. This screen is disclosed in U.S. Pat. No. 3,408,132 and is formed by compression rolling at least two sheets or continuous webs of metal with smooth rollers under high pressure of about 6,000 to 50,000 pounds per lineal inch and then peeling the sheets apart. This process produces a reflecting surface having elongated randomly aligned irregularities which extend generally in the direction perpendicular to the rolling direction. The directional quality of the aligned irregularities produces a highly directional reflecting surface which is secured against a frame with the elongated irregularities extending in a substantially vertical direction.

The highly directional characteristics of the screen disclosed in U.S. Pat. No. 3,408,132 and the other specially configured screen surfaces described above are not suitable for all applications. In addition, the cost of producing the special surface configurations renders the screens uneconomical for many applications.

BRIEF SUMMARY OF THE INVENTION

The present invention provides a front projection screen having a sufficiently high "brightness" so as to eliminate the necessity for special surface configurations in many applications. Essentially, the reflecting surface of a projection screen made according to the present invention is produced by etching a bright aluminum sheet which is free of surface defects. To preserve the surface and to enhance the effect of the etching process, the reflecting surface may also be anodized. Further, the brightness of the reflecting surface may be increased by curving the reflecting surface in at least one direction.

In addition to a unique screen surface pattern produced as described above, the present invention also provides a unique supporting member. A frame having a peg projecting therefrom is adapted to receive the reflecting screen and cooperate with an aperture or notch therein so as to prevent translation between the supporting member and the screen while allowing the screen to rotate about the peg. A second frame member is placed over the screen such that friction is created between the two supporting members and the screen. This type of support allows the screen to be oriented such that a reading line on its surface may be properly aligned with regard to a line of printed material projected thereon.

The many objects, advantages, and novel features of the present invention will become apparent from the following detailed description of the invention when considered in conjunction with the accompanying drawings.

DETAILED DESCRIPTION OF THE DRAWINGS

Figure 1:
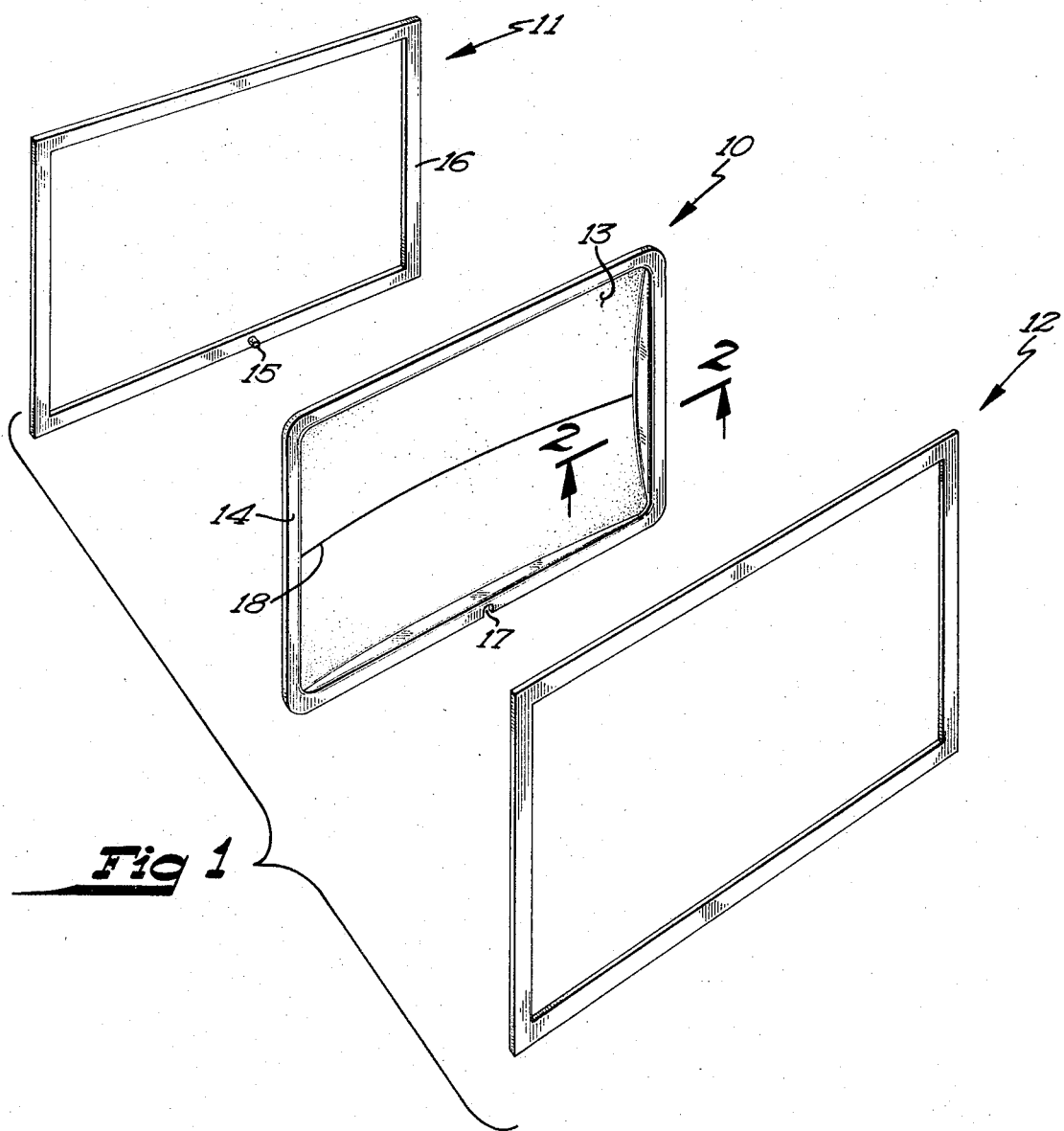
FIG. 1 is an exploded view illustrating a preferred embodiment projecting screen of the present invention along with its supporting members.

FIG. 1, which illustrates a preferred embodiment of the present invention, shows a projecting screen 10 positioned between supporting members 11 and 12. The reflecting screen 10 is preferably made of a bright aluminum sheet having no surface defects. Aluminum alloys 5005-H34 and 3003-H25 have been found suitable for the processing described herein although many other similar alloys may also be used. Also, sheets having a thickness of 0.040 inches have been employed although this thickness is not critical to the finished product, the thickness being dependent principally upon the mechanical operations to which the reflecting surface will be subjected. In a preferred embodiment, the projection screen is formed with a spherical reflecting surface 13 in a press with a spherical die while leaving a flange 14 for cooperation with the supporting members 11 and 12 in a manner to be described below. The radius of the spherical reflecting surface 13 is dependent upon the particular application of the screen 10 although, for desk top microfilm readers it has been determined that a radius approximately equal to twice the light path between the screen and the film to be projected thereon produces an exceptionally good image. Further, in some instances it is not necessary that any curvature be imparted to the reflecting surface, in which case the reflecting surface will lie within the plane of the flange portion 14.

After the reflecting surface 13 is formed, its surface is etched. For the materials specified above, the etching may be performed in a solution of Sodium Hydroxide for 5 minutes and then the surface may be clear anodized for 15 minutes at 70° F with a direct current of 12 amps per sq. ft. It has been found that the specified materials, when processed in this manner, produce a reflecting surface whose image is much brighter with the same light source than when a flat white or matte surface is used. While this surface does not exhibit the brightness of the surface produced according to the teaching of U.S. Pat. No. 3,408,132, neither is it as directional as that surface nor does it require the specialized equipment to produce it. Further, a surface prepared in the manner described above has a better resolution than other high gain surfaces because of its smoother surface finish.

As stated above, the reflecting surface 13 of the projection screen 10 is anodized following the etching process. This anodizing process provides the reflecting surface with a protective coating. Additionally, it has been determined that anodizing the reflecting surface after it has been etched enhances the effect of the etching process in terms of the suitability of the reflecting surface as a projection screen. However, it is to be understood that a suitable projection screen can be produced through the effects of the etching process alone without a subsequent anodizing operation.

Referring again to FIG. 1, the support member 11 is shown as a frame having a peg 15 extending therefrom. The dimensions of the frame are such that the back side of the reflecting surface 13 will fit within the frame with the flange 14 engaging the faces 16 of the frame. The flange 14 of the projection screen 10 is provided with a notch 17 generally corresponding in size to the diameter of the peg 15 and positioned such that the peg 15 will engage the notch 17 and prevent a translation between the projection screen 10 and the frame 11 in at least one direction. Of course, the extent to which the peg 15 and notch 17 will prevent this translation depends upon the configuration of the notch 17. For example, the notch may be semi-circular and the peg 15 circular so that translation will be effectively prevented in not only the downward direction but also the two lateral directions. Further, the notch 17 may be replaced with an aperture such that a translation between the projection screen 10 and frame 11 will be prevented in all directions. However, in most applications a notch such as that illustrated in FIG. 1 has been found suitable although the peg 15 and notch 17 need not necessarily be circular.

With the projection screen 10 positioned upon the frame 11 as described above, a second supporting member in the form of a frame 12 is positioned thereover to frictionally engage the flange 14. The central opening through the supporting member 12 provides a light path to the reflecting surface 13. Also, both of the supporting members 11 and 12 are attached to some support, a microfilm reader housing, for example. With the projection screen 10 positioned between the supporting members 11 and 12 and those supporting members frictionally engaging the flange 14, it can be seen that the supporting members 11 and 12 maintain the projection screen and its reflecting surface 13 in position through the engagement of the peg 15 with the notch 17 and the resistance to movement provided by friction upon the flange 14. However, the frictional resistance to movement can be overcome by an appropriate force applied to the projection screen 10 such that the projection screen will pivot about the peg 15. This has particular advantages in those instances where the reflecting surface 13 is provided with a reading line such as that illustrated at 18 in FIG. 1. The reading line may be painted on the reflecting surface 13 or may merely be a tape adhering thereto. In either instance, when a line of material is projected on the reflecting surface 13 and that material is misaligned with respect to the reading line 18, the reading line 18 may be aligned with respect to that material by merely pivoting the projection screen about the peg 15. This has particular advantage in those instances where several columns are projected side by side with the reading line 18 allowing an easy reference line for properly identifying a line in a column on one edge of the reflecting surface 13 with a corresponding line on its other edge. In addition, the capability of reorienting the projection screen 10 by pivoting it about the peg 15 significantly reduces the criticalness of the alignment of the material being projected within its holder.

Figure 2:
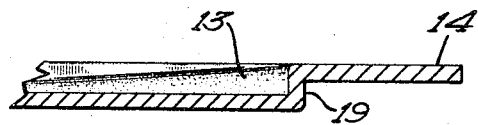
FIG. 2 is a cross section taken along the line 2—2 in FIG. 1.

FIG. 2 illustrates a cross section taken along the lines 2—2 of FIG. 1. For a spherical reflecting surface configuration such as that illustrated in FIG. 1, the connecting portion 19 between the reflecting surface 13 and the flange 14 will vary in size depending upon where the cross section is taken. Further, it is to be understood that in some applications the projection screen of the present invention may be employed with a different curvature in one or more directions or may be flat.

Obviously many modifications and variations of the present invention are possible in light of the above teachings. It is therefore to be understood that, within the scope of the appended claims, the invention may be practiced otherwise than as specifically described.

We claim:

1. A front projection screen assembly which comprises:
   an aluminum or aluminum alloy member having a reflecting surface provided with random non-directional surface irregularities formed by the etching of a smooth, bright surface which is free of surface defects; and
   means for supporting said aluminum member including pivot means engaging said aluminum member for preventing a translation of said aluminum member with respect to said supporting means in at least one direction while allowing said aluminum member to pivot with respect to said supporting means about said pivot means.

2. The projection screen assembly of claim 1 wherein said pivot means comprises a peg.

3. The projection screen assembly of claim 2 wherein said aluminum member comprises flange means extending from said reflecting surface, said flange means being provided with means for engaging said peg.

4. The projection screen assembly of claim 3 wherein said supporting means further comprises means for frictionally engaging said flange means for resisting a change in relative position between said aluminum member and said supporting means.

5. The projection screen assembly of claim 4 wherein said reflecting surface is provided with a reading line.

6. The projection screen assembly of claim 1 wherein said supporting means comprises means frictionally engaging said projection screen for resisting a change in relative position between said projection screen and said supporting means.

7. The projection screen assembly of claim 6 further comprising peg means extending from said supporting means and engaging said projection screen with respect to said supporting means in at least one direction while allowing said projection screen to pivot with respect to said supporting means about said peg means.

8. The projection screen assembly of claim 7 wherein said projection screen reflecting surface is provided with a reading line.

9. The projection screen assembly of claim 8 wherein said reflecting surface has a concave spherical configuration, the radius of curvature of said reflecting surface being approximately twice the desired distance between the projection screen and film to be projected thereon.

10. A front projection screen which comprises:
    an aluminum or aluminum alloy member having a reflecting surface provided with random non-directional surface irregularities formed by the etching of a smooth, bright surface which is free of surface defects, said reflecting surface having a concave spherical configuration and being provided with a reading line.

11. In a front projection screen assembly of the type having a projection screen including an aluminum or aluminum alloy reflecting surface and having means for supporting the projection screen, the improvement which comprises said aluminum projection screen reflecting surface being provided with random non-directional surface irregularities formed by the etching of a smooth, bright surface which is free of surface defects.

12. The projection screen assembly of claim 11 wherein said supporting means comprises pivot means engaging said projection screen for preventing a translation of said projection screen with respect to said supporting means in at least one direction while allowing said projection screen to pivot with respect to said supporting means about said pivot means.

13. The projection screen assembly of claim 12 wherein said pivot means comprises a peg and said projection screen comprises a flange means extending from said reflecting surface, said flange means being provided with means for engaging said peg.

14. In a front projection screen of the type having an aluminum or aluminum alloy projection screen reflecting surface, the improvement which comprises said aluminum projection screen reflecting surface being provided with random non-directional surface irregularities formed by the etching of a smooth, bright surface which is free of surface defects.

15. The projection screen of claim 14 wherein said reflecting surface is anodized.

16. The projection screen of claim 15 wherein said reflecting surface has a concave spherical configuration and is provided with a reading line.

17. The projection screen of claim 16 wherein the radius of curvature of said reflecting surface is approximately twice the desired distance between the projection screen and the film to be projected thereon.

* * * * *